(12) United States Patent
Kitada et al.

(10) Patent No.: US 11,132,887 B2
(45) Date of Patent: *Sep. 28, 2021

(54) EYEGLASSES-TYPE WEARABLE TERMINAL, CONTROL METHOD THEREOF, AND CONTROL PROGRAM

(71) Applicant: NEC CORPORATION, Tokyo (JP)

(72) Inventors: Masato Kitada, Tokyo (JP); Akira Kamei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,648

(22) Filed: Feb. 11, 2020

(65) Prior Publication Data

US 2020/0175838 A1 Jun. 4, 2020

Related U.S. Application Data

(63) Continuation of application No. 16/414,121, filed on May 16, 2019, now Pat. No. 10,600,311, which is a
(Continued)

(30) Foreign Application Priority Data

Mar. 23, 2016 (JP) ................................. 2016-058025

(51) Int. Cl.
*G06T 7/70* (2017.01)
*G08B 21/24* (2006.01)
(Continued)

(52) U.S. Cl.
CPC .......... *G08B 21/24* (2013.01); *G02B 27/017* (2013.01); *G06T 7/70* (2017.01); *G08B 21/0275* (2013.01);
(Continued)

(58) Field of Classification Search
None
See application file for complete search history.

(56) References Cited

U.S. PATENT DOCUMENTS

| 2004/0182925 A1* | 9/2004 | Anderson | ............... B07C 7/005 235/385 |
| 2010/0080418 A1 | 4/2010 | Ito | |

(Continued)

FOREIGN PATENT DOCUMENTS

| JP | 2010081480 A | 4/2010 |
| JP | 2010171673 A | 8/2010 |

(Continued)

OTHER PUBLICATIONS

Extended European Search Report dated Mar. 28, 2019, from the European Patent Office in Application No. 16895537.5.
(Continued)

*Primary Examiner* — John F Mortell
(74) *Attorney, Agent, or Firm* — Sughrue Mion, PLLC

(57) ABSTRACT

There is provided an eyeglasses-type wearable terminal that causes a user to more reliably recognize the position of a predetermined object, which includes an image capturing unit that captures the periphery of the user. The eyeglasses-type wearable terminal also includes a determiner that determines whether a predetermined target object is included in a video acquired by image capturing using the image capturing unit. The eyeglasses-type wearable terminal further includes a display unit that displays the position of the predetermined target object in a case in which the determiner determines that the predetermined target object is included.

9 Claims, 9 Drawing Sheets

Related U.S. Application Data continuation of application No. 16/087,347, filed as application No. PCT/JP2016/088186 on Dec. 21, 2016, now Pat. No. 10,565,854.

(51) Int. Cl.

| | | |
|---|---|---|
| *G08G 1/005* | (2006.01) | |
| *H04N 5/64* | (2006.01) | |
| *H04N 7/18* | (2006.01) | |
| *G08B 21/02* | (2006.01) | |
| *H04N 5/225* | (2006.01) | |
| *G08G 1/16* | (2006.01) | |
| *G02B 27/01* | (2006.01) | |
| *G08B 23/00* | (2006.01) | |
| *G06K 9/00* | (2006.01) | |

(52) U.S. Cl.
CPC ......... *G08B 21/0294* (2013.01); *G08B 23/00* (2013.01); *G08G 1/005* (2013.01); *G08G 1/166* (2013.01); *H04N 5/2257* (2013.01); *H04N 5/64* (2013.01); *H04N 7/18* (2013.01); *G02B 2027/0178* (2013.01); *G06K 9/00671* (2013.01); *G08B 21/0236* (2013.01); *G08B 21/0263* (2013.01); *G08B 21/0266* (2013.01)

(56) References Cited

U.S. PATENT DOCUMENTS

| | | | | |
|---|---|---|---|---|
| 2013/0241805 A1* | 9/2013 | Gomez | ............... | G06F 3/013 345/8 |
| 2014/0044305 A1* | 2/2014 | Scavezze | ............... | H04B 1/385 382/103 |
| 2016/0041613 A1 | 2/2016 | Klanner et al. | | |
| 2016/0203663 A1* | 7/2016 | Proctor | ............... | F21V 33/0008 345/8 |
| 2017/0195665 A1* | 7/2017 | Karkkainen | ............ | G06T 15/08 |
| 2017/0249745 A1 | 8/2017 | Fiala | | |
| 2018/0053413 A1* | 2/2018 | Patil | ............ | G01S 11/14 |

FOREIGN PATENT DOCUMENTS

| | | |
|---|---|---|
| JP | 2011-186681 A | 9/2011 |
| JP | 2011-227879 A | 11/2011 |
| JP | 2012-155655 A | 8/2012 |
| JP | 2013008307 A | 1/2013 |
| JP | 2014142722 A | 8/2014 |
| JP | 2014149576 A | 8/2014 |
| JP | 2015115696 A | 6/2015 |
| JP | 2015-232783 A | 12/2015 |
| KR | 1020110136018 A | 12/2011 |
| WO | 2015176163 A1 | 11/2015 |

OTHER PUBLICATIONS

International Search Report of PCT/JP2016/088186, filed Jan. 31, 2017.
Office Action dated Jun. 26, 2019 in U.S. Appl. No. 16/087,347.
Communication dated Apr. 21, 2020 from Japanese Patent Office in JP Application No. 2019-119084.
Japanese Office Action for JP Application No. 2020-132682 dated Jul. 27, 2021 with English Translation.

* cited by examiner

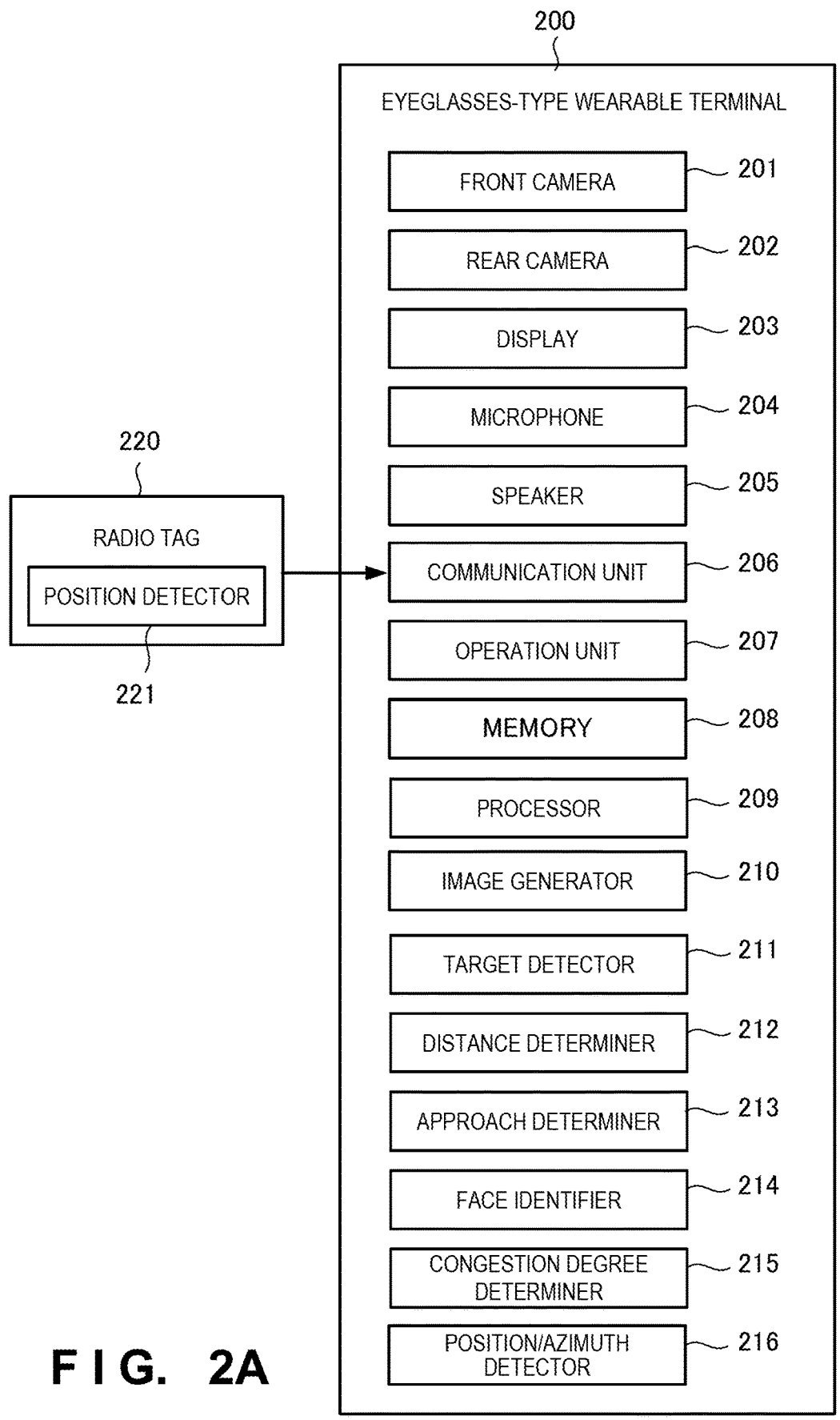
F I G. 2A

EYEGLASSES-TYPE WEARABLE TERMINAL, CONTROL METHOD THEREOF, AND CONTROL PROGRAM

CROSS REFERENCE TO RELATED APPLICATIONS

This application is a Continuation of U.S. patent application Ser. No. 16/414,121 filed May 16, 2019, which is a Continuation of U.S. patent application Ser. No. 16/087,347 filed Sep. 21, 2018, which is a National Stage of International Application No. PCT/JP2016/088186, filed on Dec. 21, 2016, claiming priority based on Japanese Patent Application No. 2016-058025 filed Mar. 23, 2016, the disclosure of which is incorporated herein in its entirety by reference.

TECHNICAL FIELD

The present invention relates to an eyeglasses-type wearable terminal, a control method thereof, and a control program.

BACKGROUND ART

In the above technical field, patent literature 1 discloses a technique of specifying a suspicious person in an image captured by a camera provided on an eyeglasses-type wearable terminal and outputting a warning message. Patent literature 2 discloses a technique of causing an eyeglasses-type terminal with a peripheral camera to notify the wearer of the terminal that an object is approaching.

CITATION LIST PATENT LITERATURE

Patent literature 1: Japanese Patent Laid-Open No. 2010-081480
Patent literature 2: Japanese Patent Laid-Open No. 2013-008307

SUMMARY OF THE INVENTION TECHNICAL PROBLEM

However, by the techniques described in the above literatures, it is impossible to know where the suspicious person or the object exists.

The present invention enables to provide a technique of solving the above-described problem.

Solution To Problem

One example aspect of the present invention provides an eyeglasses-type wearable terminal comprising:
an image capturing unit that captures a periphery;
a determiner that determines whether a predetermined target object is included in a video captured by the image capturing unit; and
a display unit that displays a position of the predetermined target object in a case in which the determiner determines that the predetermined target object is included.

Another example aspect of the present invention provides a control method of an eyeglasses-type wearable terminal including an image capturing unit that captures a periphery, comprising:
determining whether a predetermined target object is included in a video captured by the image capturing unit; and
displaying a position of the predetermined target object in a case in which it is determined in the determining step that the predetermined target object is included.

Still other example aspect of the present invention provides a control program of an eyeglasses-type wearable terminal including an image capturing unit that captures a periphery, for causing a computer to execute a method, comprising:
determining whether a predetermined target object is included in a video captured by the image capturing unit; and
displaying a position of the predetermined target object in a case in which it is determined in the determining step that the predetermined target object is included.

Advantageous Effects of Invention

According to the present invention, a user can recognize the position of a predetermined object using an eyeglasses-type wearable terminal.

BRIEF DESCRIPTION OF DRAWINGS

FIG. 2A is a block diagram showing the functional arrangement of an eyeglasses-type wearable terminal according to the second example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
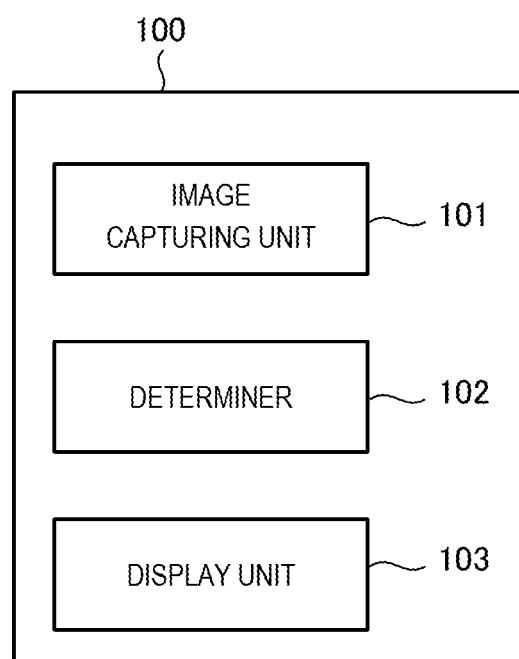
FIG. 1 is a block diagram showing the functional arrangement of an eyeglasses-type wearable terminal according to the first example embodiment of the present invention.

An eyeglasses-type wearable terminal 100 according to the first example embodiment of the present invention will be described with reference to FIG. 1. As shown in FIG. 1, the eyeglasses-type wearable terminal 100 includes an image capturing unit 101, a determiner 102, and a display unit 103.

The image capturing unit 101 captures at least the front of the eyeglasses-type wearable terminal 100. The determiner 102 determines whether a predetermined target object is included in a video captured by the image capturing unit 101.

If the determiner 102 determines that the predetermined target object is included, the display unit 103 displays the position of the predetermined target object.

According to the above-described arrangement, a user can more reliably recognize the position of a predetermined object using the eyeglasses-type wearable terminal.

Second Example Embodiment

Figure 2B:
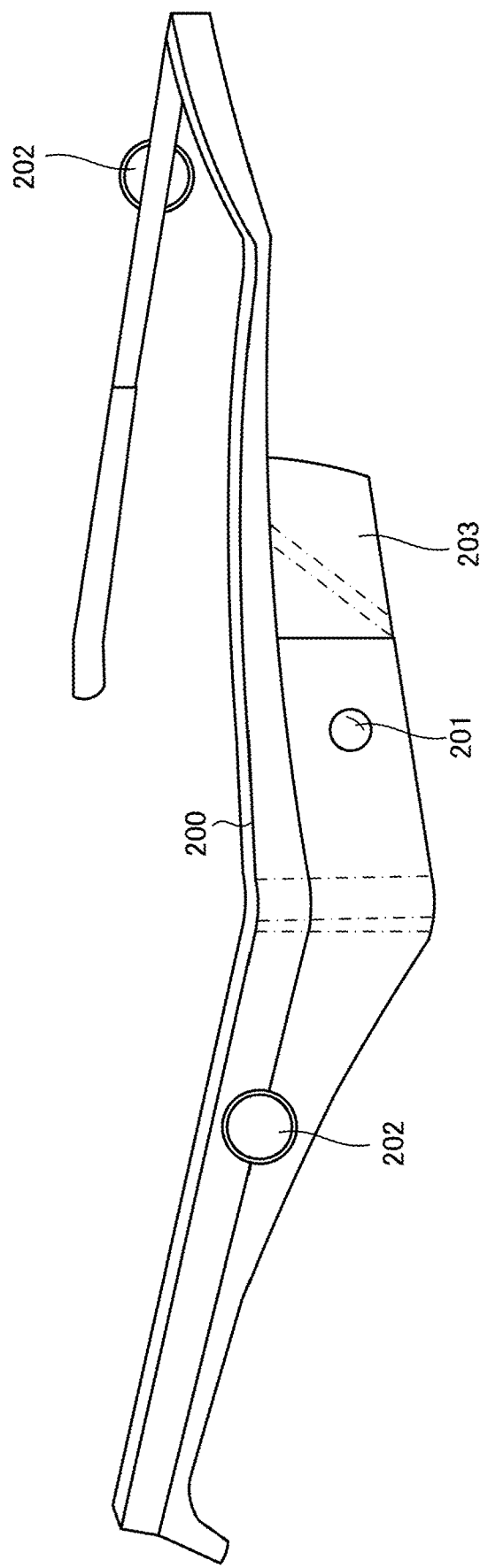
FIG. 2B is a view showing the outer appearance of the eyeglasses-type wearable terminal according to the second example embodiment of the present invention.

An eyeglasses-type wearable terminal 200 according to the second example embodiment of the present invention will be described with reference to FIGS. 2A and 2B. FIG. 2A is a block diagram showing the functional arrangement of the eyeglasses-type wearable terminal 200 according to this example embodiment, and FIG. 2B is a view showing the outer appearance of the eyeglasses-type wearable terminal 200.

As shown in FIG. 2A, the eyeglasses-type wearable terminal 200 includes a front camera 201, a rear camera 202, a display 203, a microphone 204, a speaker 205, a communication unit 206, an operation unit 207, a memory 208, and a processor 209. These are functional components basically implemented by hardware. In addition, the eyeglasses-type wearable terminal 200 includes an image generator 210, a target detector 211, a distance determiner 212, an approach determiner 213, a face identifier 214, a congestion degree determiner 215, and a position/azimuth detector 216. The components 210 to 216 are basically implemented by software. That is, these are functions implemented by executing program modules stored in the memory 208 by the processor 209. The display 203 may exist on each of the left and right sides. In addition, the ranges of the left and right lenses may be determined, and it may be determined which one of the displays should perform display.

The front camera 201 and the rear camera 202 capture the periphery of the eyeglasses-type wearable terminal 200. The communication unit 206 can communicate with an external radio tag 220 and acquires the position information of the radio tag 220 from a position detector 221. The position detector 221 may include a GPS (Global Positioning System) receiver and receive the absolute position of the radio tag 220 on the earth.

The operation unit 207 accepts an operation from a user who wears the eyeglasses-type wearable terminal 200. The memory 208 stores various kinds of data in addition to various kinds of programs.

The image generator 210 generates an image to be displayed on the display 203. More specifically, the image generator 210 generates an image that displays the position of a predetermined target object. The target detector 211 detects a predetermined target based on a signal received from the radio tag 220 or determines whether a predetermined target object is included in a captured image. The distance determiner 212 determines the distance up to a predetermined target based on the strength of a signal received from the radio tag 220. The approach determiner 213 analyzes an image captured by the front camera 201 or the rear camera 202 and determines whether an abruptly approaching object exists.

The face identifier 214 analyzes images captured by the cameras 201 and 202, identifies faces in the images, and determines whether a person registered in advance exists on the periphery. The congestion degree determiner 215 analyzes images captured by the cameras 201 and 202 and determines the congestion degree on the periphery. The position/azimuth detector 216 detects the position and direction (azimuth) of the eyeglasses-type wearable terminal 200.

Figure 3A:
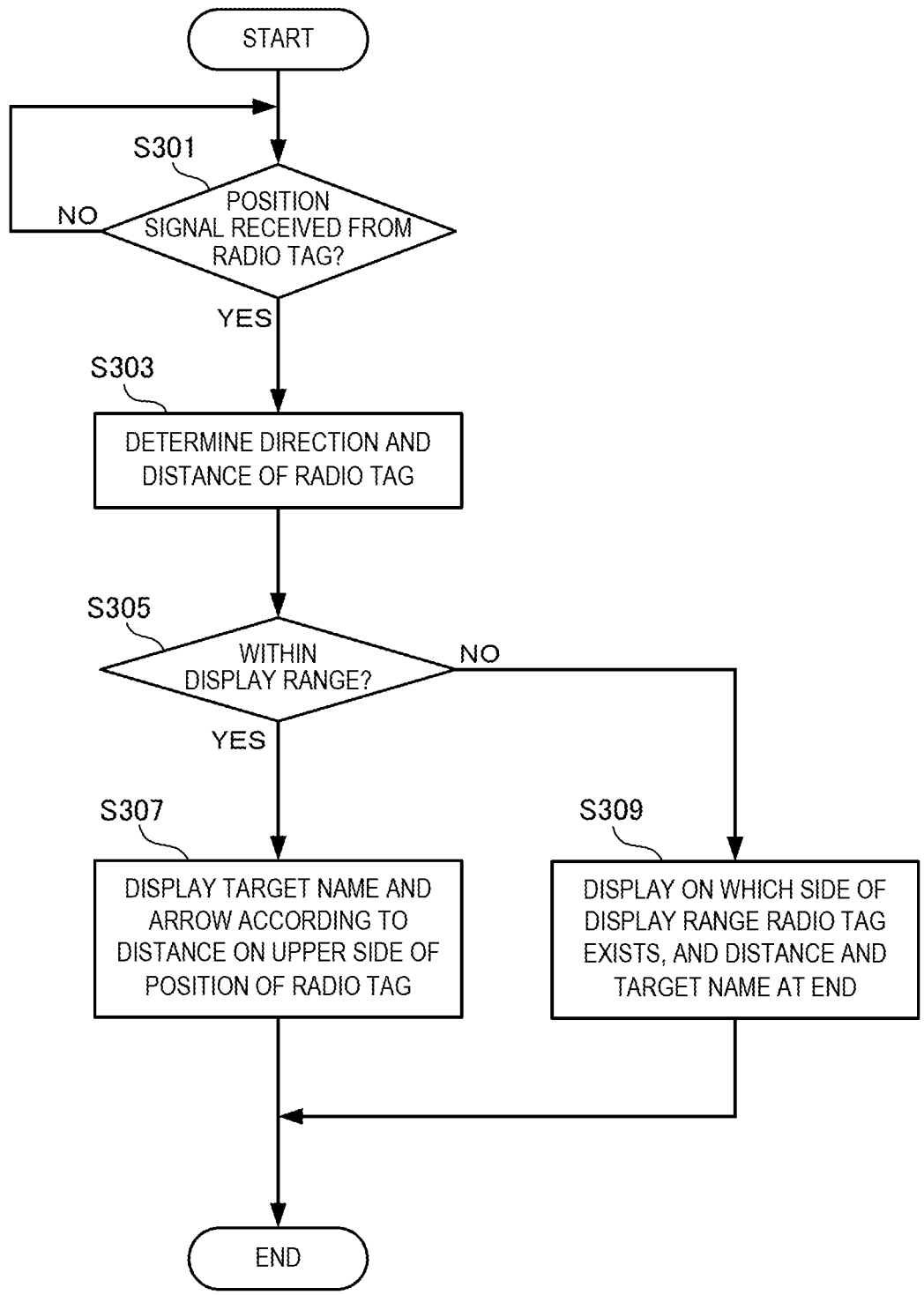
FIG. 3A is a flowchart showing the procedure of processing of the eyeglasses-type wearable terminal according to the second example embodiment of the present invention.
Figure 3B:
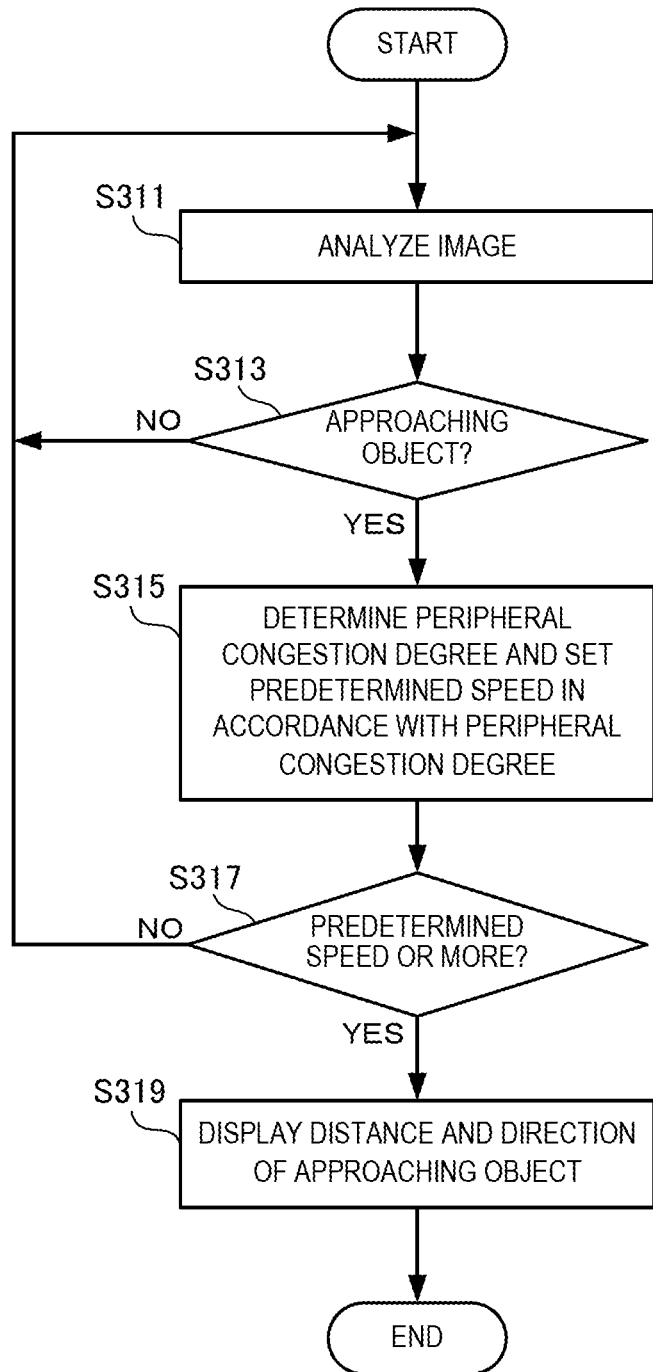
FIG. 3B is a flowchart showing the procedure of processing of the eyeglasses-type wearable terminal according to the second example embodiment of the present invention.

FIGS. 3A and 3B are flowcharts showing the procedure of processing of the eyeglasses-type wearable terminal 200. When a signal including the position information of the radio tag 220 is received from the radio tag 220 in step S301, the process advances to step S303. In step S303, the position information of the eyeglasses-type wearable terminal 200 detected by the position/azimuth detector 216 and the position information of the radio tag 220 are compared, and it is determined whether the direction of the radio tag 220 viewed from the eyeglasses-type wearable terminal 200 falls within the display range of the display 203. The display range of the display 203 can be calculated based on the direction (azimuth) of the eyeglasses-type wearable terminal 200 detected by the position/azimuth detector 216. For example, in a case in which the azimuth of the eyeglasses-type wearable terminal 200 is the due north, if the radio tag 220 is included in the range from 45° east longitude to 45° west longitude when viewed from the eyeglasses-type wearable terminal 200, it is determined that the direction of the radio tag 220 falls within the display range of the display 203.

Figure 4:
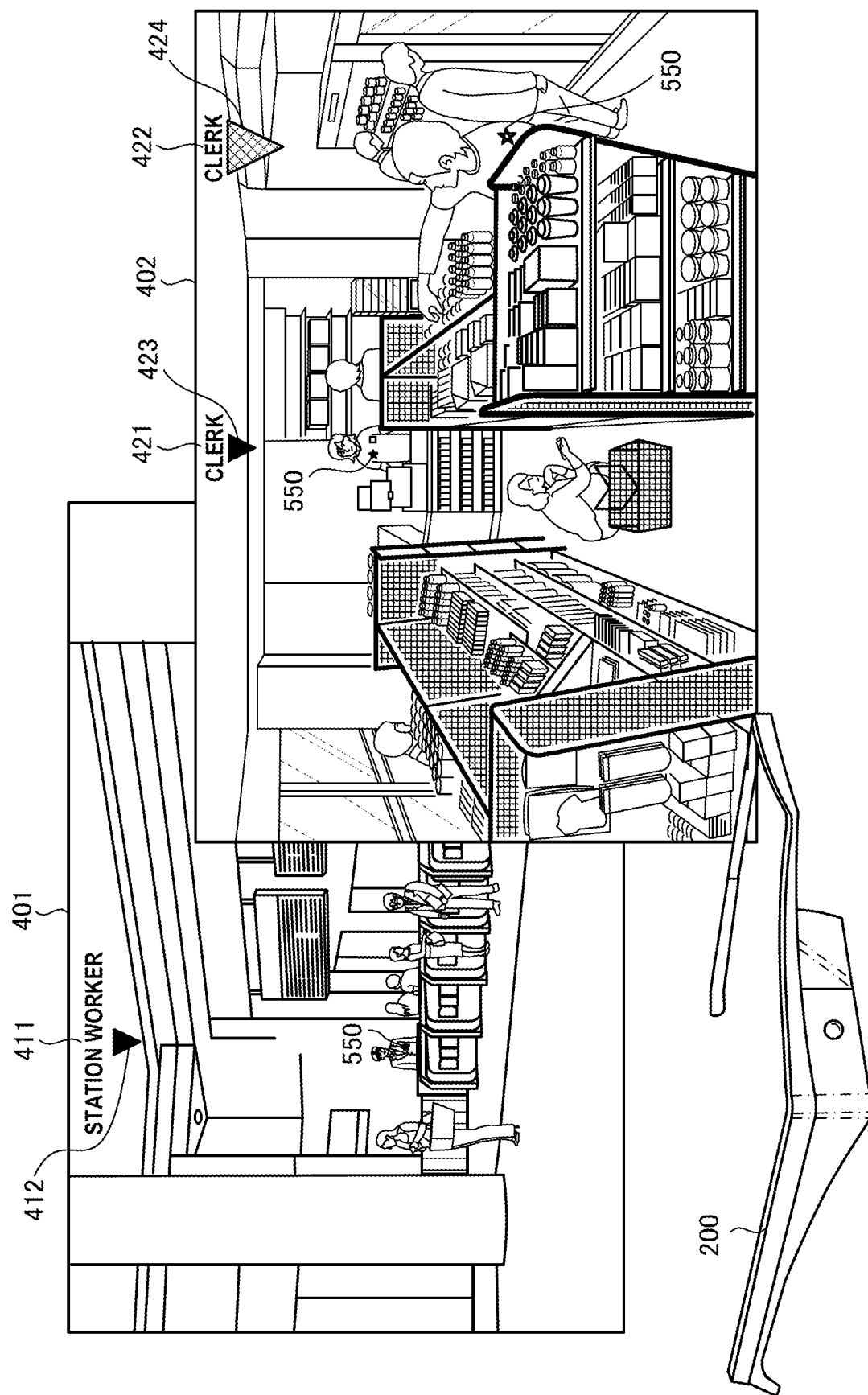
FIG. 4 is a view showing an example of the display screen of the eyeglasses-type wearable terminal according to the second example embodiment of the present invention.

If the radio tag 220 exists within the display range of the display 203, the process advances to step S307, and the image generator 210 displays a target name represented by the radio tag 220 and a downward arrow on the upper side of the position of the radio tag 220. At this time, the size of the arrow or the number of arrows is set to a size or number according to the distance between the radio tag 220 and the eyeglasses-type wearable terminal 200. If the radio tag 220 transmits information representing a clerk or a station worker, display as indicated by a screen 401 or a screen 402 shown in FIG. 4 is obtained. In the screen 401, "station worker" is displayed as a target name display 411, and an arrow 412 is displayed as an identifier representing a position such that they are overlaid on the background seen through the glass display. In the screen 402, "clerk" is displayed as each of target name displays 421 and 422, and arrows 423 and 424 are displayed as identifiers representing positions. Since the clerk indicated by the arrow 424 is close to the eyeglasses-type wearable terminal 200, the arrow 424 is displayed to be larger than the arrow 423. The color of the arrow may be changed in accordance with the distance to the target.

Figure 5:
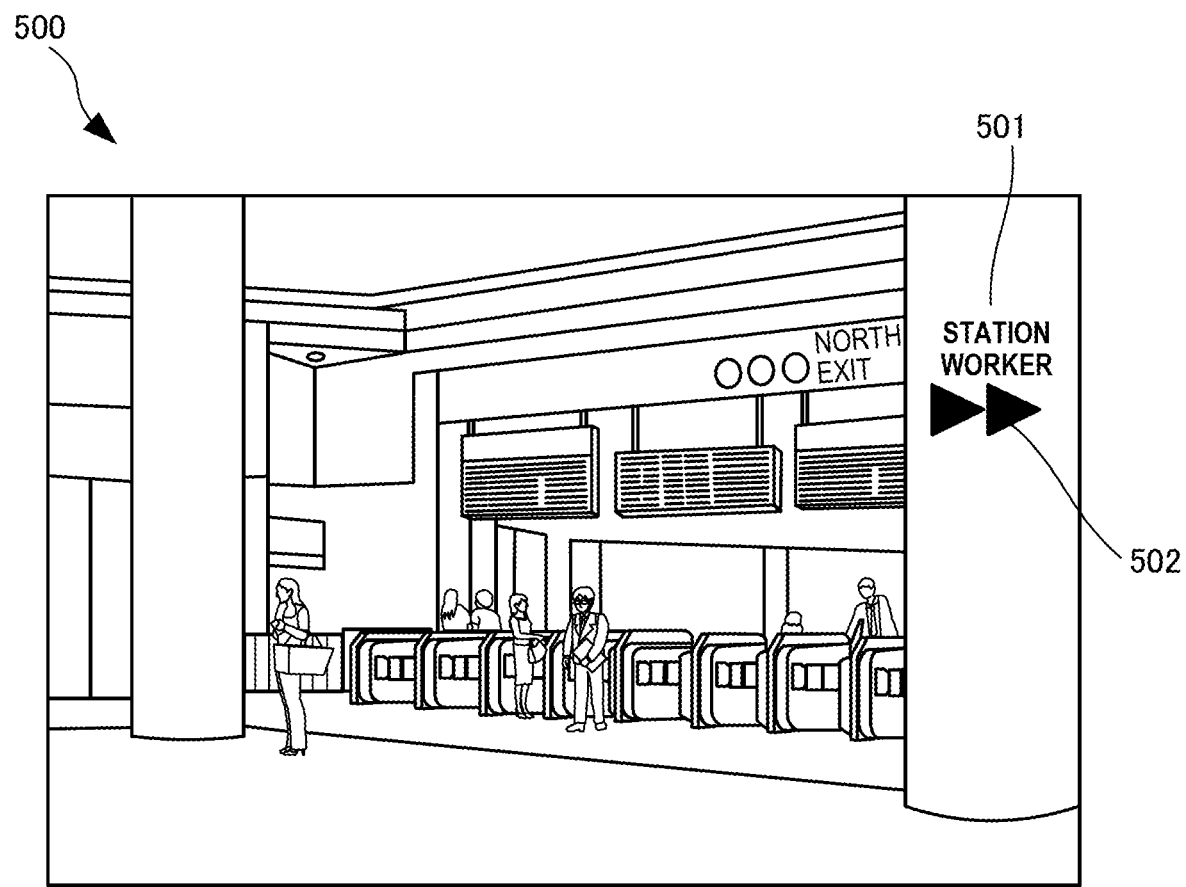
FIG. 5 is a view showing an example of the display screen of the eyeglasses-type wearable terminal according to the second example embodiment of the present invention.
Figure 6:
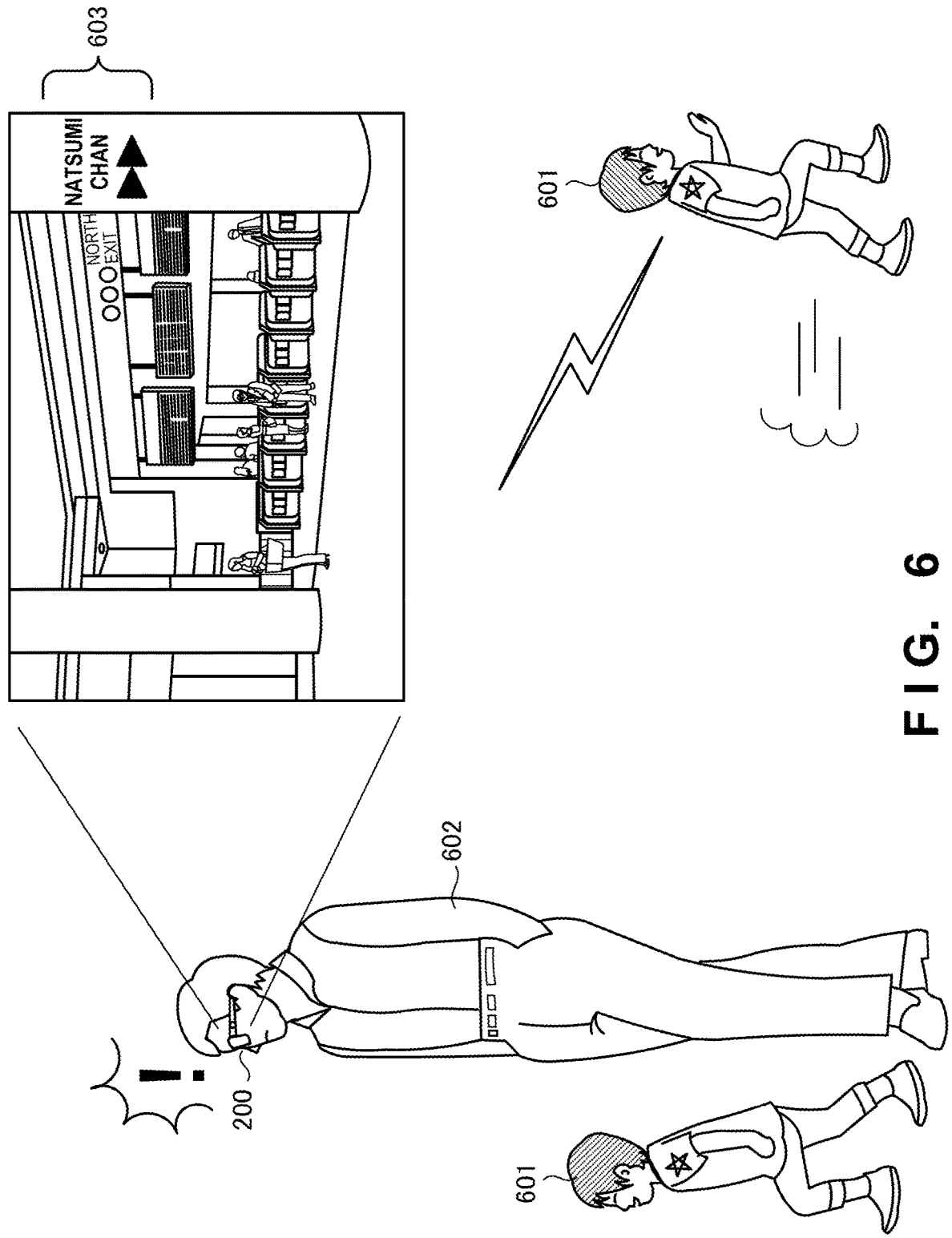
FIG. 6 is a view showing an example of the display screen of the eyeglasses-type wearable terminal according to the second example embodiment of the present invention.

If the radio tag 220 exists outside the display range of the display 203, the process advances to step S309, and a target name represented by the radio tag 220 and an arrow representing the direction (the right side or the left side of the display range) are displayed. At this time, the size of the arrow or the number of arrows is set to a size or a number according to the distance between the radio tag 220 and the eyeglasses-type wearable terminal 200. For example, in a screen 500 shown in FIG. 5, "station worker" as a target name display 501 and arrows 502 are displayed. In this example, two arrows 502 are displayed because the station worker is away. If the station worker is farther apart, three arrows are displayed. If the station worker is close, one arrow is displayed. The radio tag 220 can be attached not only to a clerk or station worker but to an arbitrary person or object. When the information of a user's child is stored in the radio tag 220, and the radio tag 220 is attached to a cloth of the child or the like, as shown in FIG. 6, even if a child 601 gets lost, a parent 602 who wears the eyeglasses-type wearable terminal 200 can see a screen display 603 and immediately recognize which child exists at which position in which direction at which distance.

The above-described processing shown in FIG. 3A is started when a request operation to display the location of the target object is input from the user. However, depending on the attribute of information in the radio tag, a setting may be done such that the distance between the radio tag 220 and the eyeglasses-type wearable terminal 200 is periodically calculated, and alert display (including the direction and the distance) is performed in a case in which they are far apart by a predetermined distance or more. For example, when the radio tag is attached to the child, the parent can immediately be notified that the child 601 is away.

Referring to FIG. 3B, in step S311, the approach determiner 213 analyzes the images captured by the cameras 201 and 202 and determines whether an approaching object that is moving toward the eyeglasses-type wearable terminal 200 exists. If an approaching object exists, the process advances from step S313 to step S315, and the congestion degree determiner 215 determines the congestion degree around the user who wears the eyeglasses-type wearable terminal 200. In addition, a predetermined speed (threshold) set in accordance with the determined congestion degree and the approaching speed of the approaching object are compared. In congestion, a possibility that a person is erroneously detected as an approaching person becomes high. Hence, the predetermined speed is set higher to reduce detection errors in association with passing pedestrians. During a high-speed movement (during driving of a vehicle, in a train, or the like), collision detection may be turned off. As for the congestion degree, faces in an image are detected. If the number of detected faces is a predetermined number or more, it may be determined that there is congestion. In addition, the congestion degree is an index value representing the degree of the number of persons existing in the monitoring place, and may be represented by the number of persons, the density, or a value obtained by calculation using at least one of the number of persons and the density. For example, an arrangement that calculates the index of the congestion degree based on the number of detected faces can be employed. Additionally, as the method of representing the congestion degree as a numerical value, it is possible to detect a crowd (a cluster of persons) and accurately estimate the number of persons in a monitoring image using the number of detected people in the crowd.

Figure 7:
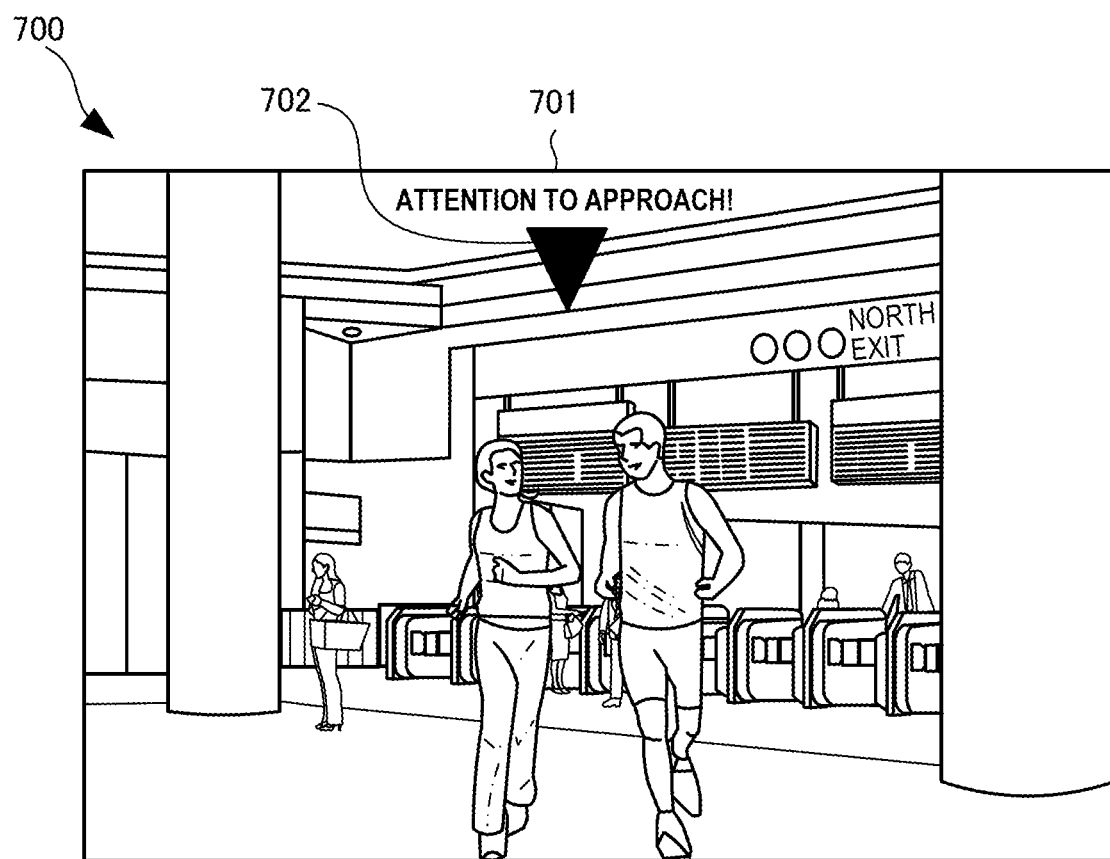
FIG. 7 is a view showing an example of the display screen of the eyeglasses-type wearable terminal according to the second example embodiment of the present invention.

If the approaching speed of the object is a predetermined speed or more, the process advances to step S319, and the image generator 210 displays the position (the direction and the distance) of the approaching object. FIG. 7 shows a screen 700 in a case in which alert display is performed for approaching persons. If an approaching person exists, as shown in the screen 700, the image generator 210 displays a warning "attention to approach!" as a target name display 701, and displays an arrow 702 as an identifier representing a position in a size according to the distance to the person. These images are displayed such that they are overlaid on the background seen through the glass display. In addition, if the user hits the approaching person (the acceleration sensor detects an acceleration of a predetermined value or more), videos captured by the cameras 201 and 202 are recorded.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the processor of the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Embodiments

Some or all of the above-described embodiments can also be described as in the following supplementary notes but are not limited to the followings.

(Supplementary Note 1)

There is provided an eyeglasses-type wearable terminal comprising:

an image capturing unit that captures a periphery;

a determiner that determines whether a predetermined target object is included in a video captured by the image capturing unit; and a display unit that displays a position of the predetermined target object in a case in which the determiner determines that the predetermined target object is included.

(Supplementary Note 2)

There is provided the eyeglasses-type wearable terminal according to supplementary note 1, wherein in a case in which the predetermined target object exists outside a display range of the eyeglasses-type wearable terminal, the display unit displays an arrow representing a direction in which the predetermined target object exists.

(Supplementary Note 3)

There is provided the eyeglasses-type wearable terminal according to supplementary note 2, wherein the display unit changes one of a size and a color of the arrow based on a distance up to the predetermined target object.

(Supplementary Note 4)

There is provided the eyeglasses-type wearable terminal according to any one of supplementary notes 1 to 3, wherein the determiner receives a signal from a radio tag provided on the predetermined target object and performs the determination based on the signal.

(Supplementary Note 5)

There is provided the eyeglasses-type wearable terminal according to supplementary note 4, wherein the signal includes position information of the predetermined target object.

(Supplementary Note 6)

There is provided the eyeglasses-type wearable terminal according to any one of supplementary notes 1 and 5, wherein the image capturing unit captures a front and a rear of the eyeglasses-type wearable terminal, the determiner determines whether an object approaching the eyeglasses-type wearable terminal exists in the video, and the display unit displays a position of the object.

(Supplementary Note 7)

There is provided the eyeglasses-type wearable terminal according to any one of supplementary notes 1 to 6, wherein the determiner detects an object included in the video, which approaches the eyeglasses-type wearable terminal at a speed not less than a predetermined threshold.

(Supplementary Note 8)

There is provided the eyeglasses-type wearable terminal according to supplementary note 7, wherein the determiner determines a congestion degree on the periphery, and if the congestion degree is high, raises the predetermined threshold.

(Supplementary Note 9)

There is provided the eyeglasses-type wearable terminal according to any one of supplementary notes 1 to 5, wherein the image capturing unit captures a front and a rear of the eyeglasses-type wearable terminal, the determiner determines whether a person registered in advance is included in the video, and the display unit displays a position of the person registered in advance.

(Supplementary Note 10)

There is provided a control method of an eyeglasses-type wearable terminal including an image capturing unit that captures a periphery, comprising:

determining whether a predetermined target object is included in a video captured by the image capturing unit; and displaying a position of the predetermined target object in a case in which it is determined in the determining that the predetermined target object is included.

(Supplementary Note 11)

There is provided a control program of an eyeglasses-type wearable terminal including an image capturing unit that captures a periphery, for causing a computer to execute a method, comprising:

determining whether a predetermined target object is included in a video captured by the image capturing unit; and displaying a position of the predetermined target object in a case in which it is determined in the determining that the predetermined target object is included.

The invention claimed is:

1. An eyeglasses-type wearable device comprising:
a glass display;
a memory storing one or more program instructions; and
a processor configured to execute the one or more instructions to:
receive a first position information representing a position of the eyeglasses-type wearable device, direction information representing a direction toward which the eyeglasses-type wearable device faces and a second position information representing a position of a radio-tag attached to a target object;
determine whether or not the target object falls within a display range of the glass display by using the first position information, the direction information and the second position information;
generate an image including at least one arrow indicating a position of the target object when the target object is not determined to fall within the display range of the glass display, a number of the at least one arrow being set according to a distance between the radio tag and the eyeglasses-type wearable device, and generates an image including at least one arrow toward the target object when the target object is determined to fall within the display range of the glass display; and
control the glass display to display the generated image.

2. The eyeglasses-type wearable device according to claim 1, wherein the processor is further configured to:
receive position information from the radio tag attached to the target object, the position information indicating a position of the radio tag,
receive personal data of the target object from the radio tag, and
control the glass display to display the personal data near the at least one arrow.

3. The eyeglasses-type wearable device according to claim 2, wherein
the target object is a child,
the radio tag is attached to a clothing of the child, and
the personal data is a name of the child.

4. The eyeglasses-type wearable device according to claim 1, wherein
the processor is further configured to control the glass display to display the at least one arrow above the target object when the target object is determined to fall within the display range of the glass display.

5. The eyeglasses-type wearable device according to claim 1, wherein
the processor is further configured to control the glass display to display the at least one arrow at the top of the display range.

6. The eyeglasses-type wearable device according to claim 1, wherein
the position information is acquired with global positioning system and indicates an absolute position on the earth, and
wherein the processor is further configured to determine whether or not the target object falls within the display range of the glass display by comparing the position of the eyeglasses-type wearable device and the position information.

7. The eyeglasses-type wearable device according to claim 1, wherein
the processor is further configured to:
periodically calculate the distance between the radio tag and the eyeglasses-type wearable device based on a strength of a signal received from the radio tag, and
control the glass display to display the generated image when the distance exceeds a predetermined distance.

8. A notification method performed by an eyeglasses-type wearable device comprising a glass display, the notification method comprising:
receiving, by a processor, a first position information representing a position of the eyeglasses-type wearable device, direction information representing a direction toward which the eyeglasses-type wearable device faces and a second position information representing a position of a radio-tag attached to a target object;
determining, by the processor, whether or not the target object falls within a display range of the glass display by using the first position information, the direction information and the second position information;
generating, by the processor, an image including at least one arrow indicating a position of the target object when the target object is not determined to fall within the display range of the glass display, a number of the at least one arrow being set according to a distance between the radio tag and the eyeglasses-type wearable device, and generating an image including at least one arrow toward the target object when the target object is determined to fall within the display range of the glass display; and controlling, by the processor, the glass display to display the generated image.

9. A non-transitory computer-readable storage medium storing a program that causes an eyeglasses-type wearable device comprising a glass display to perform:

receiving, by a processor, a first position information representing a position of the eyeglasses-type wearable device, direction information representing a direction toward which the eyeglasses-type wearable device faces and a second position information representing a position of a radio-tag attached to a target object;

determining, by the processor, whether or not the target object falls within a display range of the glass display by using the first position information, the direction information, and the second position information;

generating, by the processor, an image including at least one arrow indicating a position of the target object when the target object is not determined to fall within the display range of the glass display, a number of the at least one arrow being set according to a distance between the radio tag and the eyeglasses-type wearable device, and generating an image including at least one arrow toward the target object when the target object is determined to fall within the display range of the glass display; and controlling, by the processor, the glass display to display the generated image.

* * * * *